Patented July 11, 1950

2,514,789

UNITED STATES PATENT OFFICE 2,514,789

ADHESIVES FROM BLOOD HEMOGLOBIN, FORMALDEHYDE, A PEROXIDE, AND ETHYLENE DIAMINE

George Otto Orth, Jr., Seattle, Wash., assignor to Armour and Company, Chicago, Ill., a corporation of Illinois No Drawing. Application June 8, 1946, Serial No. 675,442

9 Claims. (Cl. 260—6)

This invention relates to adhesives and to structures bonded thereby. The invention deals particularly with adhesives suitable for use in the manufacture of laminated wood timbers and to processes for preparing the improved adhesives. The invention also includes improved processes utilizing such adhesives in the manufacture of bonded structures.

Heretofore two principal types of adhesives have been used commercially in the manufacture of laminated wood structures. These are casein compositions and resorcin resins.

The casein adhesives have been widely used but they are not very satisfactory because they do not produce a water proof bond and the laminated structures which have been bonded with casein adhesives cannot be used where they are exposed to the weather.

The resorcin resins produce strong bonds which have waterproof qualities. However, the resorcin resin bonds are quite rigid and offer considerable resistance to cutting tools. Also they are somewhat brittle and subject to rupture through shock. They are quite expensive and are economically adaptable only in special kinds of manufacture. It would be very desirable to provide a suitable adhesive from readily available materials by simple methods so that the adhesive could be produced in volume for large scale usage.

An important object of this invention is to provide such an adhesive from readily available materials which is thermosetting at relatively low temperature and will produce a strong bond having water-resistant qualities and having somewhat elastic characteristics when wet. Other objects and advantages of the invention will be apparent as the description proceeds.

My improved adhesive utilizes a chemical combination produced through the reaction of blood hemoglobin and an aldehyde such as formaldehyde. Instead of using simply formaldehyde, I prefer to use an aldehyde-polyamine condensate. The reaction between the hemoglobin and the aldehyde, or polyamine, may be conducted in the presence of an oxidizing agent such as tertiary butyl hydroperoxide. Though the exact mechanism of the reaction has not been definitely established, it appears that the oxidizing agent so affects the hematin of the hemoglobin as to open the hemoglobin for reaction with aldehyde and also with polyamine. The aldehyde-polyamine condensate is subject to breakdown under mild heat to release aldehyde and polyamine for reaction with the hemoglobin.

The blood hemoglobin may be applied to the process in whole animal blood from cattle, hogs, sheep, etc., or in any blood fraction, which contains appreciable amounts of hemoglobin. I prefer to use blood fractions which contain a higher percentage of hemoglobin than is contained in the natural whole blood. The hemoglobin may be in liquid or dry form. Conveniently I may utilize the commercial dried hemoglobin which is the fraction of whole blood remaining after separation of the light or albumin fraction. In compounding the adhesive, the hemoglobin may be used in aqueous solution, the concentration of which may vary widely, the hemoglobin being for example 10–70% on a dry basis. Whenever amounts of hemoglobin are indicated in this specification and claims, the amounts may be taken as on a dry basis.

The aldehyde is preferably formaldehyde, suitably in the form of paraldehyde since in this form it is liquid at atmospheric pressures. Any other aldehyde, for example, acetaldehyde, may be used.

Any polyamine may be employed including diamines, triamines, both aliphatic and aromatic. Preferably I use an alkyl amine and I find ethylene diamine to be particularly effective.

Also, I may use any oxidizing agent. Tertiary butyl hydroperoxide has been found particularly effective. Tertiary butyl perbenzoate is another very effective oxidizing agent for use in connection with the hemoglobin.

The materials above described may be combined in various ways. However, I have found that one of the best ways of preparing the adhesive is to make a two part composition and I will now describe this procedure.

For convenience I will designate the two parts of the composition as "A" and "B."

Part A has as its principal ingredient the blood hemoglobin. Suitably hemoglobin in dry or powder form may be mixed with water to form a liquid solution. To this solution I prefer to add a suitable preservative which will serve to protect against mold and bacterial decay. Ethyl mercury phosphate, marketed under the tradename "Lignasan," is a suitable preservative and 1 or 2 percent of this in my composition is sufficient to serve the intended purpose. Other preservatives which may be used are sodium arsenite or orthochlorphenol.

Also, for the purpose of preservation, I prefer to adjust the pH of the Part A solution to between 7 and 8, or better between 7.8 and 7.9, and this can be accomplished by adding an alkaline material such as caustic soda. However, a better way of making this adjustment is to add a small quantity of the aldehyde-polyamine condensate which is prepared for use in connection with Part B.

The condensate has a preserving action in its own right independently of its effect on the pH. Also it might be observed that the Lignasan or other similar preservative serves to increase the pH, thus obtaining an additional preservative influence. It is, of course, not necessary to use the Lignasan or other like preservatives and good results may be obtained without it, especially where a portion of the aldehyde-polyamine is added to Part A.

Part B contains as a principal ingredient the aldehyde, preferably the condensate of aldehyde and polyamine. This condensate may be prepared by condensing two mols of aqueous or solid formaldehyde with one mol of ethylene diamine and maintaining the condensation product on the alkaline side, for example at a pH above 9, suitably 10 to 10.5. The condensate so prepared may be used in aqueous solution of about 50 per cent concentration.

Part B contains also the oxidizing agent, and as before stated, I find tertiary butyl hydroperoxide particularly effective. Only a small amount of the oxidizing agent is necessary. In formulations which I have found quite satisfactory, an amount which represents about 3.0 to 3.5 per cent of the hemoglobin is sufficient.

I may also include a suitable filler for adhesives such as walnut shell flour or powdered bone meal. Walnut shell flour is found preferable for the best results. The walnut shell flour, or like ingredient, serves to help fill the small irregularities in and between the adjoining surfaces to be bonded. Further, I find that it is possible to include a plasticizer in the composition which aids in several respects. It helps the flowing out and drying characteristics and serves to promote penetration of the adhesive into the wood during the curing operation. Since it passes into the wood, it does not adversely affect the water resistance of the resulting bond. It also helps to prevent the open surface of the coated area from drying too quickly. Ethylene glycol serves this purpose very well and other plasticizers such as glycerine, diethylene, glycol, or any of the polyglycols may be used.

For increasing the viscosity of the adhesive, I prefer to incorporate in Part B a quantity of a suitable bodying agent such as methyl cellulose. Other bodying agents which may be used are hydroxy-methyl cellulose, polyvinyl acetate emulsion, or a vegetable protein such as "KEM-222," or St. John's Bread. Such agents add to the workability of the adhesive on a spreading roll and also serve to retard the drying or skinning over of the surface of freshly spread boards.

If desired, I may also incorporate a small quantity of an alkali such as calcium hydroxide in the composition of Part B. This may be included for the purpose of assisting in neutralizing certain wood acids.

A specific formulation of Parts A and B is given as follows:

PART A 30 parts powdered hemoglobin
45 parts water
0.15–0.6 part Lignasan
0.00–0.1 part formaldehyde-ethylene diamine condensate (50% solution) to adjust pH to 7.8–7.9.

PART B 10.0 parts walnut shell flour
5.5 parts formaldehyde-ethylene diamine condensate (50% solution)
4.0 parts ethylene glycol
1.0 part tertiary butyl hydroperoxide
10.0 parts 4% solution of medium viscosity methyl cellulose in water
0.2 part calcium hydroxide The individual parts of the two part composition as above described will keep indefinitely without spoilage and at such time as it is desired for use the separate parts may be mixed. The relative proportion of these two parts is subject to substantial variation. I find it quite satisfactory to use about 75% of A to 30 parts of B. Part A may be added to Part B, or Part B may be added to Part A. It is better to add all of Part A since the mixture of only a portion of Part A with the whole of Part B is likely to generate more heat than is desired and as a result shorten the working life of the mixture. The mixing may be performed at ordinary temperatures and of course should not be performed at temperatures which will produce a setting-up of the adhesive. No special equipment is necessary for the mixing operation. The adhesive when mixed is stable at room temperatures and remains stable for use for several hours, eight hours or more.

After being mixed as above described, the improved adhesive may be spread on the surface of the planed boards which are to be laminated. The spreading may be done by brush, spreader, or other satisfactory method. The coating applied may be of the order of 40 to 60 pounds per thousand square feet of surface. The boards are then assembled with the adhesive coating between the laminations, the boards being placed with the grain in one parallel with the grain in the other. The boards thus assembled are held together under pressures of about 10 to 150 pounds per square inch in a heated chamber until the bonds are set. Usually temperatures of about 140–160° F. at the glue line are satisfactory and the curing period may be of the order of 10 to 20 hours. Higher temperatures may be employed but are not necessary. In general, somewhat higher curing temperatures require somewhat shorter curing periods, and lower temperatures require longer curing periods. The length of period required also varies with the size of the timbers being handled. Steam may be introduced into the curing chamber to maintain moist atmospheric conditions, preferably about 100 percent humidity, and at the same time supply necessary heat.

The pH of the adhesive when applied may be of the order of 8.4 to 8.8 and this will decrease somewhat on exposure to the wood acids.

It is a further feature of my improved adhesive that its surface may be treated with water prior to the closing of the assembly. If after the adhesive is applied to the boards, a substantial amount of time elapses before they are assembled and pressure is applied, so that the surface of the adhesive becomes somewhat dried, I may reactivate the adhesive coating by spraying on a bit of water. This serves to counteract and prevent the objectionable surface effect caused by moisture evaporation. Such operation is not permitted either by the casein or resorcin adhesives which have heretofore been employed.

The adhesive bond formed by my improved methods is strong and will resist shearing stress to a greater extent than does the wood itself. It is water resistant so that the bonded timber structures may be used on the outside where they are exposed to weather conditions. When soaked in water the improved bond may soften to some extent but does not weaken. The improved bond has a substantial amount of elasticity and will permit the swelling and contracting of the laminated timbers to take place with little danger of disturbing the adhesive bonds. Also, it will resist shock to a greater extent than will timber structures bonded by resorcin resins for example, and it may be worked or tooled with less dulling of saws and less injury to other tools employed.

It is my belief that the oxidizing agent (in Part B of the two part composition) operates on the hematin or iron-containing element of the hemoglobin to open the chemical structure or in some way condition it for reaction with the formaldehyde or polyamine. Although formaldehyde will react with the albumin of the blood without the action of an oxidizing agent, the reaction obtained between the hemoglobin and the aldehyde or polyamine as a result of the oxidizing effect is particularly beneficial. This hemoglobin oxidation reaction appears largely responsible for the water resistant qualities of the adhesive.

The effect of the oxidizing agent in my process may in some cases be enhanced by the use of an alcohol along with it in the solution. Suitably the alcohol may be mixed with the oxidizing agent prior to its being introduced into the solution. For example, the formula of Part B could be as follows:

Part B 100 parts walnut shell flour
55 parts 50% solution formaldehyde diamine
100 parts 4% aqueous metocel
20 parts calcium hydroxide
5 to 20 parts ethyl alcohol
5 to 10 parts 30% hydrogen peroxide The polyamine-aldehyde condensate product is believed to serve to advantage in several ways. For one thing, it holds the aldehyde and polyamine reactants in a substantially unreactive form to enable the adhesive to be mixed and spread before the insolubilizing reaction takes place. After the adhesive is spread and the timbers are subjected to curing temperatures, these reactants are liberated and reacted with the blood hemoglobin. Thus the condensate serves to prevent the rapid or violent reaction of the formaldehyde which would otherwise take place on mixture. The polyamine released from the condensate is also subject to reaction in the hemoglobin molecule and the result of the combined reaction is a linking and cross linking of more or less linear polyamine chains joining the hemoglobin and other molecular structures of the blood ingredient.

While my improved adhesive is particularly effective in the manufacture of bonded wood timbers, it may also be used in many other situations such as in the manufacture of plywood, in the bonding of leather in shoe manufacture, in fiber cementing and in high frequency gluing techniques.

The foregoing detailed description is given for explanation only and it is expected that the invention may be practiced in many different forms and the procedures and conditions specifically set forth may be modified greatly, all within the spirit and principles of the invention.

What I claim and desire to secure in Letters Patent is:

1. An adhesive, comprising a reaction product of blood hemoglobin, formaldehyde, a peroxide, and ethylene diamine.

2. An adhesive, comprising a reaction product of blood hemoglobin, formaldehyde, ethylene diamine, and butyl hydroperoxide.

3. An adhesive, comprising a reaction product of blood hemoglobin, formaldehyde, ethylene diamine, and tertiary butyl perbenzoate.

4. An adhesive, comprising a reaction product of blood hemoglobin, a peroxide, and a formaldehyde ethylene diamine condensate.

5. An adhesive, comprising a reaction product of blood hemoglobin, paraformaldehyde, ethylene diamine, a peroxide, and ethyl alcohol.

6. In a process for forming an adhesive bond, the steps of forming a stable composition in two parts consisting of blood hemoglobin, formaldehyde, ethylene diamine, and a peroxide, the peroxide being in a part separate from the blood hemoglobin, and combining the parts with water to form an adhesive mixture.

7. In a process for forming an adhesive bond, the steps of forming in one part dry blood hemoglobin and in another part a formaldehyde-ethylene diamine condensate and a peroxide, and combining the two parts together with water to form a thermosetting adhesive.

8. In a process for forming a thermosetting adhesive, the steps of reacting blood hemoglobin, a peroxide, formaldehyde and ethylene diamine in the presence of water, applying the adhesive to a surface, and later activating the exposed surface of the adhesive by applying water to the partially dried adhesive.

9. A process for preparing a thermosetting adhesive, the steps of reacting blood hemoglobin, formaldehyde, ethylene diamine and a peroxide in the presence of water.

GEORGE OTTO ORTH, Jr.

REFERENCES CITED

The following references are of record in the file of this patent:

UNITED STATES PATENTS

| Number | Name | Date |
|---|---|---|
| 1,732,015 | Homberg | Oct. 15, 1929 |
| 1,786,488 | Homberg | Dec. 30, 1930 |
| 1,851,951 | Dike | Mar. 29, 1932 |
| 1,851,953 | Dike | Mar. 29, 1932 |
| 1,877,202 | Satow | Sept. 13, 1932 |
| 2,056,456 | Howald | Oct. 6, 1936 |
| 2,066,857 | Rozema et al. | Jan. 5, 1937 |
| 2,191,802 | Novotny et al. | Feb. 27, 1940 |
| 2,262,770 | La Piana | Nov. 18, 1941 |
| 2,315,402 | D'Alelio | Mar. 30, 1943 |
| 2,334,545 | D'Alelio | Nov. 16, 1943 |

OTHER REFERENCES

Meyer, Natural & Synthetic High Polymers, Interscience, 1942, page 496.